Aug. 15, 1950  E. E. JELLEY  2,518,695
PHOTOGRAPHIC PRINT
Filed March 30, 1946
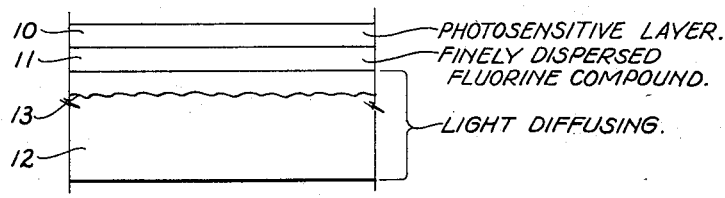
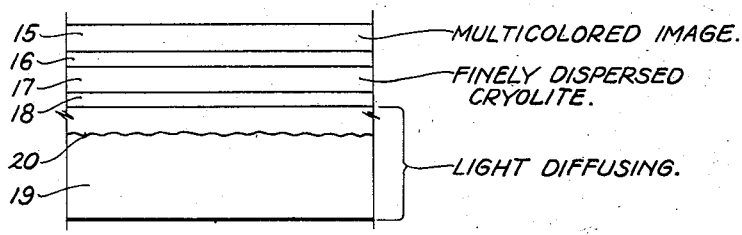

Patented Aug. 15, 1950

2,518,695

UNITED STATES PATENT OFFICE 2,518,695

PHOTOGRAPHIC PRINT

Edwin E. Jelley, Rochester, N. Y., assignor to Eastman Kodak Company, Rochester, N. Y., a corporation of New Jersey Application March 30, 1946, Serial No. 658,513

3 Claims. (Cl. 41—22)

1

This invention relates to photographic supports specifically to light-diffusing supports such as paper or white film. Specifically the present invention is an improved modification of the invention of Hanson and Evans described in patent application 576,230, filed February 5, 1945, now abandoned.

The object of the invention is to provide a low index subbing layer between the picture layer and the light-diffusing support so as to eliminate halation effects in accordance with the Hanson and Evans invention.

It is the main object of the invention to provide a subbing material which may be coated satisfactorily and which is compatible both with the base and with the photosensitive layer or the image layer which the photosensitive layer ultimately becomes.

The present invention is based on my discovery that the index of refraction of a layer is actually affected by materials dispersed therein provided the particles are less than .2 microns in diameter. Particles about .1 micron are of course far above molecular dimensions and yet they do contribute to the refractive index of the medium in which they are dispersed. According to the invention, a subbing layer is made up of a finely dispersed fluorine compound such as cryolite or sodium fluosilicate dispersed in a protective film of plastic such as cellulose acetate or polymethyl methacrylate. It is an advantage to use a protective plastic having, itself, as low a refractive index as possible. The refractive index of the composite material is not easy to measure since it does not give a sharp critical angle of internal reflection when placed on an Abbe refractometer, but nevertheless, practical tests have shown that the index of refraction is quite low and that the material is capable of giving and does give, a remarkable diminution in stain level when used in color photographs. There is in most cases a certain residual degree of diffusivity in the subbing layer due to the dispersed particles, but in practice this too is negligible. Of course the diffusivity would at worst, act merely like the paper base without the present invention, but in fact it does not detract greatly from the present invention regarding its ability to reduce highlight stain. The effects of such stain are most noticeable in color photographs and hence the present invention is most desirable in connection with such photographs.

In order to get a useful effect there should be a high percentage of fluorine compound in the transparent vehicle in which it is dispersed, specifically the ratio of fluorine compound to vehicle should be greater than 1:2. Similarly over 50% of the dispersed particles should be smaller than .2 micron in diameter, preferably about .1 micron but actually there is no lower limit on the invention except of course that particles of molecular size do not constitute dispersed particles. In this latter connection, cross reference is made to copending, now abandoned, application Serial No. 654,757 filed March 15, 1946, by Dr. Gale F. Nadeau and the continuation-in-part application thereof, Ser. No. 73,964, filed February 1, 1949, now Pat. No. 2,481,770 of September 13, 1949, relative to solutions of soluble fluorine compounds, particularly for use as an antihalation layer in films. Particles larger than .2 micron increase the diffusivity of the layer making it act more like the paper base itself and thus the larger particles might conceivably reduce the efficiency of the present invention aside from the fact that they do not aid in reducing the index of refraction and hence are wasted.

The present invention is illustrated in the accompanying drawing in which:

Fig. 1 is a highly magnified cross section of a photosensitive material incorporating the present invention.

Fig. 2 similarly illustrates a multicolor print incorporating a preferred embodiment of the present invention.

In Fig. 1 a photosensitive layer 10 is coated on a subbing layer 11 which contains a finely dispersed fluorine compound in a transparent protective plastic vehicle. This is carried by a light-diffusing support 12 which may be paper or white film or which may include a transparent layer next to the subbing layer 11. The wavy line 13 is used to indicate that light diffusion occurs somewhere in the layer 11, possibly right at its surface. It is common practice to treat the surface of the paper with successive coatings before coating a photosensitive layer thereon.

In Fig. 2, a print consisting of a multicolored image 15 is carried on a light-diffusing support made up of a plurality of layers. Of these layers, 16 and 18 are transparent subbings, 17 is a low refractive index layer according to the present invention containing finely dispersed cryolite in cellulose acetate. The supporting layer 19 is light diffusing as indicated by the wavy line 20 included therein.

The low refractive index layer should be between .00005 and .005 inch thick as taught by Hanson and Evans in order to give the optical effect required. Also the index of refraction of the subbing layer should be at least .08 less than that of the image layer.

The invention is not limited to these specific structures but is of the scope of the appended claims.

I claim:

1. A photographic print material comprising a white light-diffusing base, an intermediate layer between .00005 and .005 inch thick coated on the base and consisting of a fine dispersion of cryolite in a water protective transparent vehicle selected from the group consisting of cellulose esters and polyalkylmethacrylates, the ratio of fluorine compound to vehicle being greater than 1:2 and over 50% of the dispersed particles being smaller than .2 micron in diameter, and a light sensitive layer coated on the front of the intermediate layer with an index of refraction at least .08 greater than that of the intermediate layer.

2. A color photograph comprising a transparent layer containing a multicolored picture, a light-diffusing backing for the picture and between the backing and the picture layer an intermediate layer between .00005 and .005 inch thick with an index of refraction at least .08 less than that of the picture layer and consisting of a fine dispersion of cryolite in a water protective transparent vehicle selected from the group consisting of cellulose esters and polyalkylmethacrylates, the ratio of fluorine compound to vehicle being greater than 1:2 and over 50% of the dispersed particles being smaller than .2 micron in diameter.

3. A photographic sheet containing a transparent layer, a light diffusing layer and between the two layers an intermediate layer whose index of refraction is at least .08 lower than that of each of the two layers, the thickness of the intermediate layer and the separation of the other two layers both being between .00005 and .005 inch, the intermediate layer consisting of a fine dispersion of cryolite in a water protective transparent vehicle selected from the group consisting of cellulose esters and polyalkylmethacrylates, the ratio of cryolite to vehicle being greater than 1:2 and over 50% of the dispersed particles being smaller than .2 micron in diameter.

EDWIN E. JELLEY.

REFERENCES CITED

The following references are of record in the file of this patent:

UNITED STATES PATENTS

| Number | Name | Date |
|---|---|---|
| 2,331,716 | Nadeau et al. | Oct. 12, 1943 |
| 2,376,428 | Hansell | May 22, 1945 |
| 2,391,127 | Carver | Dec. 18, 1945 |
| 2,400,365 | Murray | May 14, 1946 |
| 2,400,366 | Murray | May 14, 1946 |